US012787062B2

(12) United States Patent
Ryu et al.

(10) Patent No.: US 12,787,062 B2
(45) Date of Patent: Nov. 3, 2026

(54) CLEAR TO SEND FRAME TRANSMISSION ON A NON-PRIMARY CHANNEL

(71) Applicant: NXP USA, Inc., Austin, TX (US)

(72) Inventors: Kiseon Ryu, San Diego, CA (US); Liwen Chu, San Ramon, CA (US); Rui Cao, Sunnyvale, CA (US); Huizhao Wang, San Jose, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 323 days.

(21) Appl. No.: 18/538,277

(22) Filed: Dec. 13, 2023

(65) Prior Publication Data

US 2024/0205973 A1 Jun. 20, 2024

Related U.S. Application Data

(60) Provisional application No. 63/387,700, filed on Dec. 16, 2022.

(51) Int. Cl.
*H04W 74/0816* (2024.01)
*H04W 72/12* (2023.01)

(52) U.S. Cl.
CPC ....... *H04W 74/0816* (2013.01); *H04W 72/12* (2013.01)

(58) Field of Classification Search
CPC ............. H04W 74/0816; H04W 72/12; H04W 72/0453; H04W 84/12
See application file for complete search history.

(56) References Cited

U.S. PATENT DOCUMENTS

2017/0290060 A1* 10/2017 Kim .................. H04W 72/0453
2021/0168864 A1* 6/2021 Seok ................. H04W 72/0446
2021/0315025 A1* 10/2021 Seok ................. H04W 74/0808
2022/0086910 A1* 3/2022 Kneckt ............. H04W 74/0816
2023/0189340 A1* 6/2023 Kim ......................... H04L 27/26 370/329
2023/0319887 A1* 10/2023 Huang .................. H04L 1/0068 370/329

OTHER PUBLICATIONS

"MU-RTS Trigger/CTS Frame Exchange Sequence Procedure," IEEE, 2023.
Sindhu Verma, et al., "Dynamic Subban Operation," doc.:IEEE 802.11-22/2204r0, Jan. 18, 2023.
Sindhu Verma, et al., "Proposals on Unused Bandwidth Utilizations," doc.:IEEE 802.11-20/0363r3, Aug. 26, 2020.

* cited by examiner

*Primary Examiner* — Afshawn M Towfighi

(57) ABSTRACT

A method and system including: transmitting, by an access point (AP), a multi-user request to send (MU-RTS) frame requesting a non-AP station (non-AP STA) to respond with a clear to send (CTS) frame on one or more 20 MHz non-primary subchannels; and receiving, by the AP, a CTS frame from the non-AP STA on the one or more 20 MHz non-primary subchannels.

15 Claims, 11 Drawing Sheets

CLEAR TO SEND FRAME TRANSMISSION ON A NON-PRIMARY CHANNEL

CROSS-REFERENCE TO RELATED APPLICATIONS

This application claims the benefit of U.S. Provisional Patent Application No. 63/387,700, filed Dec. 16, 2022, the contents of which are incorporated for all purposes by reference herein in its entirety.

FIELD OF THE DISCLOSURE

Various exemplary embodiments disclosed herein relate to clear to send (CTS) frame transmission on a non-primary channel.

BACKGROUND

Multi-user request to send (MU-RTS) Trigger frame indicates whether the clear to send (CTS) frame is to be sent on the primary 20 MHz channel, primary 40 MHz channel, primary 80 MHz channel, primary 160 MHz channel, 80+80 MHz channel, or 320 MHz channel. The MU-RTS/CTS procedure may incur unnecessary resource waste and reduce transmission opportunities within the basic service set (BSS). The transmit opportunity (TXOP) protection mechanism using an RTS or an MU-RTS Trigger frame does not provide the TXOP protection to an subchannel selective transmission (SST) non-access point (AP) station (STA).

SUMMARY

A summary of various exemplary embodiments is presented below.

Various embodiments relate to a method including: transmitting, by an access point (AP), a multi-user request to send (MU-RTS) frame requesting a non-AP station (non-AP STA) to respond with a clear to send (CTS) frame on one or more 20 MHz non-primary subchannels; and receiving, by the AP, a CTS frame from the non-AP STA on the one or more 20 MHz non-primary subchannels.

Various embodiments are described, wherein the non-AP STA may respond on at least one of a plurality of 20 MHz non-primary subchannels and wherein the received CTS frame is received on at least one of the plurality of 20 MHz non-primary channels.

Various embodiments are described, wherein the non-AP STA may respond on at least one of a plurality of 20 MHz non-primary subchannels when at least one of the plurality of 20 MHz non-primary channels is idle.

Various embodiments are described, wherein the CTS frame is further transmitted on a 20 MHz primary channel in addition to the one or more 20 MHz non-primary subchannels.

Various embodiments are described, wherein the non-AP STA is a subchannel selective transmission (SST) non-AP STA.

Various embodiments are described, further including sending, by the AP, sub-band scheduling information to the non-AP STA.

Various embodiments are described, wherein the MU-RTS frame includes resource unit (RU) allocation bitmap indicating 20 MHz non-primary subchannels that may be used by the non-AP STA for a CTS frame transmission.

Various embodiments are described, wherein the MU-RTS frame includes RU allocation control subfield indicating if the RU allocation bitmap is used by the non-AP STA for a CTS frame transmission.

Various embodiments are described, wherein the MU-RTS frame includes a bit indication that indicates where the RU allocation bitmap subfield or the RU allocation subfield indicates a non-primary channel.

Further various embodiments relate to a method including: receiving, by a non-access point station (non-AP STA) from an access point (AP), an multi-user request to send (MU-RTS) indicating that the non-AP STA responds with a clear to send (CTS) frame on one or more 20 MHz non-primary subchannels; performing, by the non-AP STA, a carrier sense operation on the one or more 20 MHz non-primary subchannels to determine whether the 20 MHz non-primary subchannel is idle; and transmitting, by the non-AP STA, a CTS frame on the one or more 20 MHz non-primary subchannels when the corresponding 20 MHz non-primary subchannel is idle based on the carrier sense operation.

Various embodiments are described, wherein the non-AP STA may respond on at least one of a plurality of 20 MHz non-primary subchannels and wherein the CTS frame is transmitted on at least one of the plurality of 20 MHz non-primary channels.

Various embodiments are described, wherein the non-AP STA may transmit the CTS frame on at least one of a plurality of 20 MHz non-primary subchannels when at least one of the plurality of 20 MHz non-primary channels is idle.

Various embodiments are described, wherein the CTS frame is further transmitted on a 20 MHz primary channel in addition to the one or more 20 MHz non-primary subchannels.

Various embodiments are described, wherein the non-AP STA is a subchannel selective transmission (SST) non-AP STA.

Various embodiments are described, further including receiving, by the non-AP STA, from the AP sub-band scheduling information.

Various embodiments are described, wherein the MU-RTS frame includes resource unit (RU) allocation bitmap indicating 20 MHz non-primary subchannels that may be used by the non-AP STA for a CTS frame transmission.

Various embodiments are described, wherein the MU-RTS frame includes RU allocation control subfield indicating if the RU allocation bitmap is used by the non-AP STA for a CTS frame transmission.

Various embodiments are described, wherein the MU-RTS frame includes a bit indication that indicates where the RU allocation bitmap subfield or the RU allocation subfield indicates a non-primary subchannel allocation.

Further various embodiments relate to an access point (AP), including a processor configured to: transmit a multi-user request to send (MU-RTS) frame requesting a non-AP station (non-AP STA) to respond with a clear to send (CTS) frame on one or more 20 MHz non-primary subchannels; and receive a CTS frame from the non-AP STA on the one or more 20 MHz non-primary subchannels.

Further various embodiments relate to a non-access point station (non-AP STA), including a processor configured to: receive an multi-user request to send (MU-RTS) indicating that the non-AP STA responds with a clear to send (CTS) frame on one or more 20 MHz non-primary subchannels; perform a carrier sense operation on the one or more 20 MHz non-primary subchannels to determine whether the 20 MHz non-primary subchannel is idle; and transmit a CTS frame on the one or more 20 MHz non-primary subchannels when the corresponding 20 MHz non-primary subchannel is idle based on the carrier sense operation.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of wireless networks with primary link operation with single radio MLD or NSTR AP MLD systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Several aspects of WiFi systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
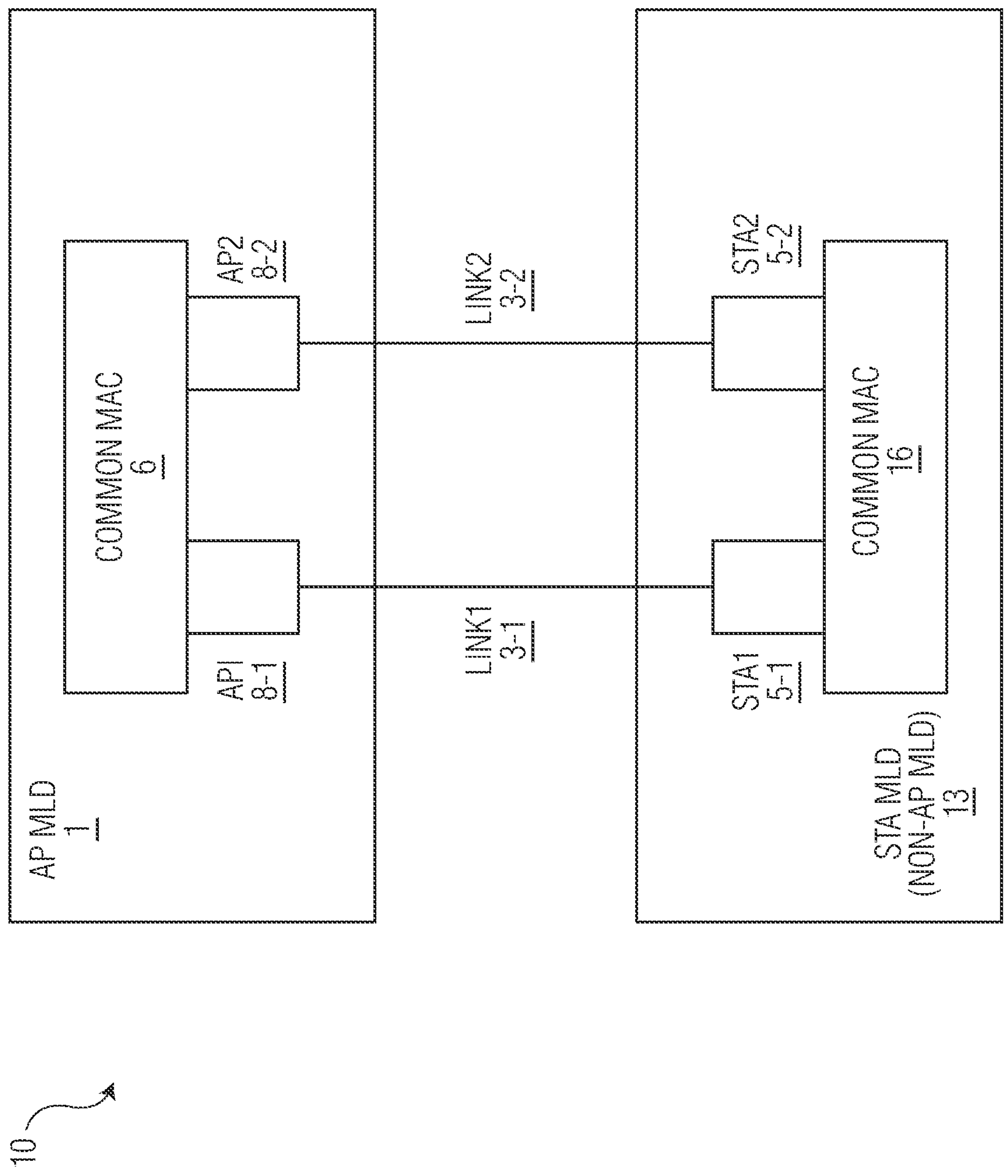
FIG. 1 depicts a multi-link communications system that is used for a wireless network.

FIG. 1 depicts a multi-link communications system 10 that is used for wireless (e.g., WiFi) communications according to an embodiment. In the embodiment depicted in FIG. 1, the multi-link communications system includes one AP multi-link device, which is implemented as AP MLD 1, and one non-AP STA multi-link device, which is implemented as STA MLD (non-AP MLD) 13. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with an IEEE 802.11bn protocol. Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). IEEE 802.11bn is referred to as ultra-high reliability (UHR). The terms VHT, HE, EHT, and UHR will be used in the descriptions found herein.

Although the depicted multi-link communications system 10 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD and multiple associated STA MLDs, or multiple AP MLDs and multiple STA MLDs with each STA MLD being associated with an AP MLD. In some embodiments, the legacy STAs (non-HE STAs) associate with one of the APs affiliated with the AP MLD. In some embodiment an AP MLD may have a single affiliated AP. In some embodiment a STA MLD may have a single affiliated STA. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 1 includes a common MAC 6 and two APs 8-1, 8-2 in two links. In such an embodiment, the APs may be AP1 8-1 and AP2 8-2. In some embodiments, a common MAC 6 of the AP MLD 1 implements upper layer Media Access Control (MAC) functionalities (e.g., association establishment, reordering of frames, etc.) and a link specific part of the AP MLD 1, i.e., the APs 8-1 and 8-2, implement lower layer MAC functionalities (e.g., backoff, frame transmission, frame reception, etc.), PHY layer functionalities, radios. The APs 8-1 and 8-2 may be implemented in hardware (e.g., circuits), software, firmware, or a combination thereof. The APs 8-1 and 8-2 may be fully or partially implemented as an integrated circuit (IC) device. In some embodiments, the APs 8-1 and 8-2 may be wireless APs compatible with at least one WLAN communications protocol (e.g., at least one IEEE 802.11 protocol). For example, the APs 8-1 and 8-2 may be wireless APs compatible with the IEEE 802.11bn protocol.

In some embodiments, an AP MLD (e.g., AP MLD 1) connects to a local area network (e.g., a LAN) and/or to a backbone network (e.g., the Internet) through a wired connection and wirelessly connects to wireless STAs, for example, through one or more WLAN communications protocols, such as an IEEE 802.11 protocol. In some embodiment, an AP (e.g., AP1 8-1 and/or AP2 8-2) includes multiple RF chains. In some embodiments, an AP (e.g., AP1 8-1 and/or AP2 8-2) includes at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 8-1 or 8-2 of the AP MLD 1 with multiple RF chains may operate in a different basic service set (BSS) operating channel (in a different link). For example, AP1 8-1 may operate in a 320 MHz BSS operating channel at 6 GHz band, and AP2 8-2 may operate in a 160 MHz BSS operating channel at 5 GHz band. Although the AP MLD 1 is shown in FIG. 1 as including two APs, other embodiments of the AP MLD 204 may include more than two APs, or one AP only.

In the embodiment depicted in FIG. 1, the non-AP STA multi-link device, implemented as STA MLD 13, includes a common MAC 16, two non-AP STAs 5-1 and 5-2 in two links. In such an embodiment, the non-AP STAs may be STA1 5-1 and STA2 5-2. The STAs 5-1 and 5-2 may be implemented in hardware (e.g., circuits), software, firmware, or a combination thereof. The STAs 5-1 and 5-2 may be fully or partially implemented as an IC device. In some embodiments, the non-AP STAs 5-1 and 5-2 are part of the STA MLD 13, such that the STA MLD may be a communications device that wirelessly connects to a wireless AP MLD. For example, the STA MLD 13 may be implemented in a laptop, a desktop personal computer (PC), a mobile phone, or other communications device that supports at least one WLAN communications protocol. In some embodiments, the non-AP STA MLD 13 is a communications device compatible with at least one IEEE 802.11 protocol (e.g., an IEEE 802.11bn protocol, an IEEE 802.11be protocol, an IEEE 802.11ax protocol, or an IEEE 802.11ac protocol). In some embodiments, the STA MLD 13 implements a common MAC functionality 16 and the non-AP STAs 5-1 and 5-2 implement a lower layer MAC data functionality, PHY functionalities.

In some embodiments, the AP MLD 1 and/or the STA MLD 13 may identify which communication links support multi-link operation during a multi-link operation setup phase and/or exchanges information regarding multi-link capabilities during the multi-link operation setup phase. In some embodiments, each of the non-AP STAs 5-1 and 5-2 of the STA MLD 13 in different link may operate in a different frequency band. For example, the non-AP STA1 5-1 in one link may operate in the 2.4 GHz frequency band and the non-AP STA2 5-2 in another link may operate in the 5 GHz frequency band. In some embodiments, each STA includes at least one antenna, at least one transceiver operably connected to the at least one antenna, and at least one controller connected to the corresponding transceiver. In some embodiments, at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 13 communicates with the AP MLD 1 via two communication links, e.g., link 1 3-1 and link 2 3-2. For example, each of the non-AP STAs 3-1 or 3-2 communicates with an AP 8-1 or 8-2 via corresponding communication links 3-1 or 3-2. In an embodiment, a communication link (e.g., link 1 3-1 or link 2 3-2) may include a BSS operating channel established by an AP (e.g., AP1 8-1 or AP2 8-2) that features multiple 20 MHz channels used to transmit frames (e.g., Beacon frames, management frames, etc.) being carried in Physical Layer Convergence Protocol (PLCP) Protocol Data Units (PPDUs) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 13 is shown in FIG. 1 as including two non-AP STAs, other embodiments of the STA MLD 13 may include one non-AP STA or more than two non-AP STAs. In addition, although the AP MLD 1 communicates (e.g., wirelessly communicates) with the STA MLD 13 via multiple links 3-1 and 3-2, in other embodiments, the AP MLD 1 may communicate (e.g., wirelessly communicate) with the STA MLD 13 via more than two communication links or less than two communication links.

As described above a multi-link AP MLD has one or multiple links where each link has one AP affiliated with the AP MLD. This may be accomplished by having the different radios for the different affiliated APs.

A multi-link STA MLD has one or multiple links where each link has one STA affiliated with the STA MLD. One way to implement the multi-link STA MLD is using two or more radios, where each radio is associated with a specific link. For example, an multi-link multi-radio (MLMR) non-AP MLD may be used. The MLMR non-AP MLD uses multiple full functional radios to monitor the medium in multiple links. Another way to implement the multi-link STA MLD is using a single radio in two different bands. Each band may be associated with a specific link. In this case only one link is available at a time. In yet another implementation, an enhanced single-radio (ESR) STA MLD may be used that operates in an enhanced multi-link single radio (eMLSR) mode. The ESR STA MLD uses two radios in different bands to implement the MLD. For example, one radio may be a lower cost radio with lesser capabilities and the other radio may be a fully functional radio supporting the latest protocols. The ESR STA MLD may dynamically switch its working link while it can only transmit or receive through one link at any time. The ESR STA MLD may monitor two links simultaneously, for example, detecting medium idle/busy status of each link, or receiving a PPDU on each link. Each radio may have its own backoff time, and when the backoff counter for one of the radios becomes zero that radio and link may be used for transmission. For example, if an AP wants to use the fully functional radio, it may send a control frame that is long enough for the ESR STA MLD to switch from the lesser capable radio to the fully functional radio that may then transmit data to the AP. When an ESS includes multiple AP MLDs in different locations and a STA MLD executed the data frame exchanges with one of the AP MLDs (say AP MLD1), as the STA MLD's associated AP MLD moves to other location to do the data frame exchanges with another one of the AP MLDs (say AP MLD2), the STA MLD (same as a non-AP MLD herein) needs to finish the association with AP MLD2 before doing the data frame exchanges with AP MLD2. There is a requirement to decrease the number of associations within the ESS.

Multi-user request to send (MU-RTS) Trigger frame indicates whether the clear to send (CTS) frame is to be sent on the primary 20 MHz channel, primary 40 MHz channel, primary 80 MHz channel, primary 160 MHz channel, 80+80 MHz channel, or 320 MHz channel. The MU-RTS/CTS procedure may incur unnecessary resource waste and reduce transmission opportunities within the basic service set (BSS). The transmit opportunity (TXOP) protection mechanism using an RTS or an MU-RTS Trigger frame does not provide the TXOP protection to an subchannel selective transmission (SST) non-access point (AP) station (STA).

Embodiments of CTS frame transmission include the following features. The CTS frame in response to an MU-RTS frame can be transmitted on secondary channel only. The CTS frame in response to an MU-RTS frame can be transmitted on the primary 20 MHz channel and on secondary subchannel(s). The CTS frame in response to an MU-RTS frame can be transmitted by an SST non-AP STA and a sub-band scheduled non-AP STA. The CTS frame in response to an MU-RTS frame can be transmitted even when one of the allocated subchannel is busy.

The MU-RTS Trigger/CTS frame exchange sequence procedure allows an AP to initiate a TXOP and protect the TXOP frame exchange sequences. An AP may transmit an MU-RTS Trigger frame to solicit simultaneous CTS frame transmissions from one or more non-AP STAs.

Figure 2:
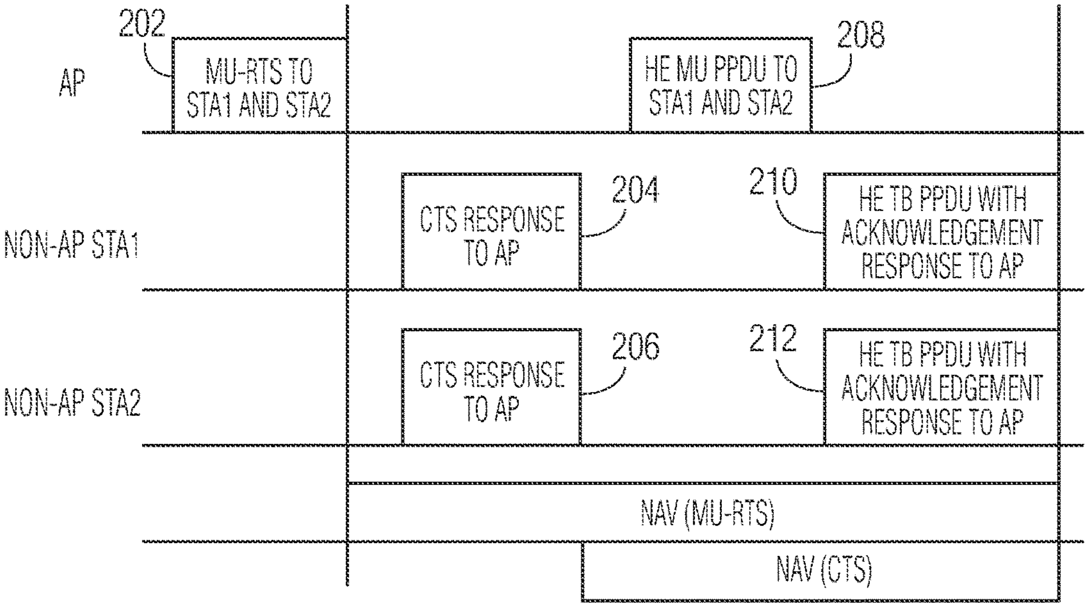
FIG. 2 illustrates a MU-RTS and CTS exchange between an AP and non-AP STAs according to an embodiment.

The RU Allocation subfield in the User Info field of the MU-RTS Trigger frame addressed to the non-AP STA indicates whether the CTS frame is to be sent on the primary 20 MHz channel, primary 40 MHz channel, primary 80 MHz channel, primary 160 MHz channel, 80+80 MHz channel, or 320 MHz channel. FIG. 2 illustrates a MU-RTS and CTS exchange between an AP and non-AP STAs according to an embodiment. An AP sends an MU-RTS to STA1 and STA2 at 202. The non-AP STA1 and non-AP STA2 send a CTS responses 204 and 206 to the AP. The AP then sends a HE MU PPDU to STA1 and STA2 208. The non-AP STA1 and non-AP STA2 send HE TB PPDUs 210 and 212 to the AP.

In SST operation, an HE STA that supports HE SST operation is an HE SST non-AP STA. An HE AP that supports HE subchannel selective transmission (SST) operation is an HE SST AP. An HE SST non-AP STA and an HE SST AP may set up SST operation by negotiating a trigger-enabled target wake time (TWT) as defined in 26.8.2 (Individual TWT agreements) of the IEEE 802.11 specification with the following exceptions.

The TWT request may have a TWT Channel field with up to one bit set to 1 to indicate the secondary channel requested to contain the resource unit (RU) allocations addressed to the HE SST non-AP STA that is a 20 MHz operating STA. The TWT request may have a TWT Channel field with all 4 LSBs or all 4 MSBs set to 1 to indicate whether the primary 80 MHZ channel or the secondary 80 MHz channel is requested to contain the RU allocations addressed to the HE SST non-AP STA that is an 80 MHz operating STA. The TWT response shall have a TWT Channel field with up to one bit set to 1 to indicate the secondary channel that will contain the RU allocations addressed to the HE SST non-AP STA that is a 20 MHz operating STA. The TWT response shall have a TWT Channel field with all 4 LSBs or all 4 MSBs set to 1 to indicate whether the primary 80 MHz channel or the secondary 80 MHz channel will contain the RU allocations addressed to the HE SST non-AP STA that is a 80 MHz operating STA.

The HE SST AP follows the rules in section 26.8.2 (Individual TWT agreements) of the IEEE 802.11 specification to exchange frames with the HE SST non-AP STA during trigger-enabled TWT SPs, except that the AP shall ensure the following. The individually addressed RUs allocated in downlink (DL) MU PPDUs and in Trigger frames addressed to the HE SST non-AP STA are within the subchannel indicated in the TWT Channel field of the TWT response and follow the RU restriction rules defined in section 27.3.2.8 (RU restrictions for 20 MHZ operation) of the IEEE 802.11 specification if the HE SST non-AP STA is a 20 MHz operating STA and in section 27.3.2.9 (80 MHz operating non-AP HE STAs) of the IEEE 802.11 specification if the HE SST non-AP STA is an 80 MHz operating STA.

The HE SST non-AP STA follows the rules in section 26.8.2 (Individual TWT agreements) of the IEEE 802.11 specification to exchange frames with the HE SST AP during trigger-enabled TWT SPs, except that the STA shall be available in the subchannel indicated in the TWT Channel field of the TWT response at TWT start times and shall not access the medium in the subchannel using distributed coordination function (DCF) or enhanced distributed channel access function (EDCAF).

There are a number of motivations to allow for a CTS frame in response to a MU-RTS Trigger frame to be carried in a secondary channel.

Figure 3:
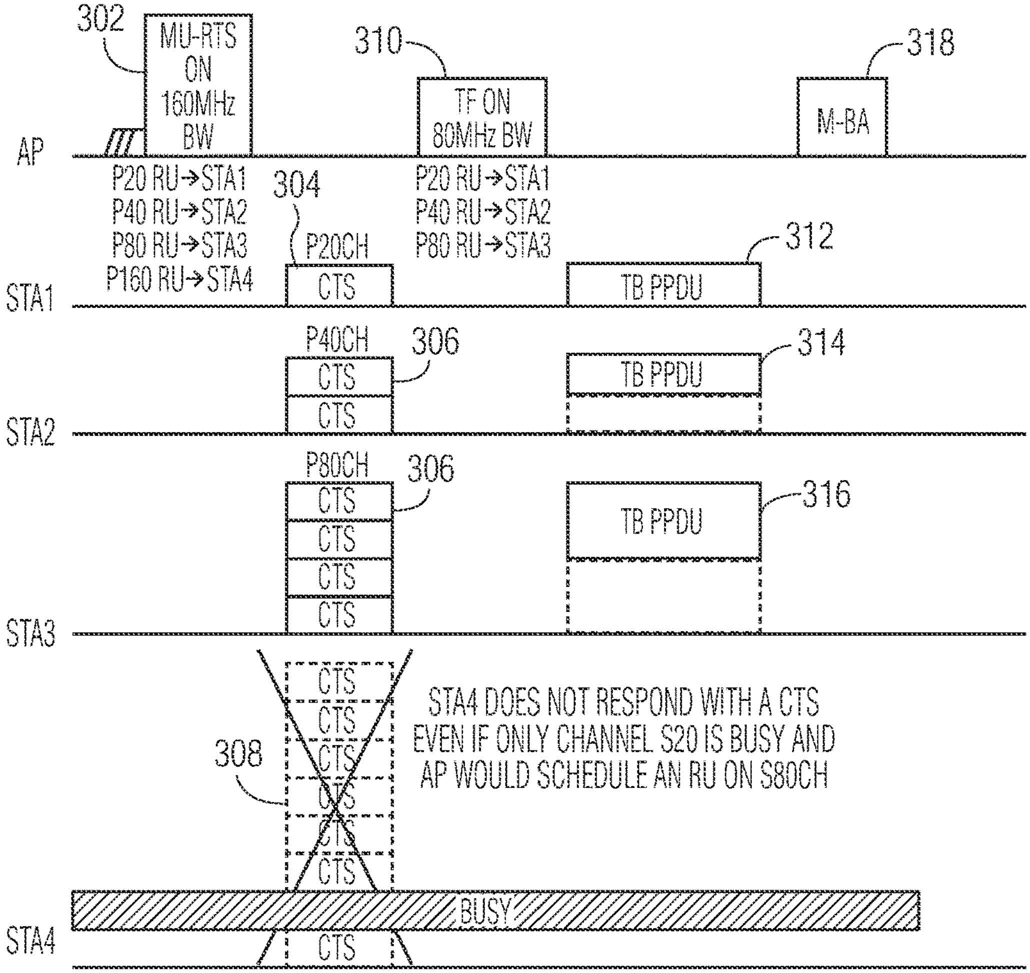
FIG. 3 illustrates a MU-RTS and CTS exchange between an AP and STA1, STA2, STA3, and STA4 according to an embodiment.

A CTS frame in response to an MU-RTS Trigger frame can be transmitted on the primary 20 MHz channel, primary 40 MHz channel, primary 80 MHz channel, primary 160 MHZ channel, 80+80 MHz channel, or 320 MHz channel in the non-HT (duplicate) PPDU. FIG. 3 illustrates a MU-RTS and CTS exchange between an AP and STA1, STA2, STA3, and STA4 according to an embodiment.

For example, the MU-RTS Trigger frame 302 indicates RU allocations of primary 20 MHz channel to STA1, primary 40 MHz channel to STA2, primary 80 MHz channel to STA3, and primary 160 MHz channel to STA4. The STAs send back CTS frames 304, 306, and 308. If a 20 MHz subchannel of the allocated RU is busy based on the combination of virtual CS and ED-based CCA during the SIFS after the PPDU containing the MU-RTS Trigger frame (e.g., STA4 senses the busy channel of the secondary 20 MHz channel 308), the STA(e.g., STA4) shall not respond with the CTS frame 308. Even though an AP intends to allocate secondary 80 MHz channel resource to STA4 through the following Trigger frame 310, the AP is not able to do it since the AP does not receive CTS frame on the secondary 80 MHz channel from the STA4. It incurs resource waste and reduces transmission opportunities within the BSS. STA1, STA2, and STA3 respond to the Trigger frame 310 with TB PPDUs 312, 314, and 316. The AP then send a multi-STA block acknowledgement (M-BA).

Figure 4:
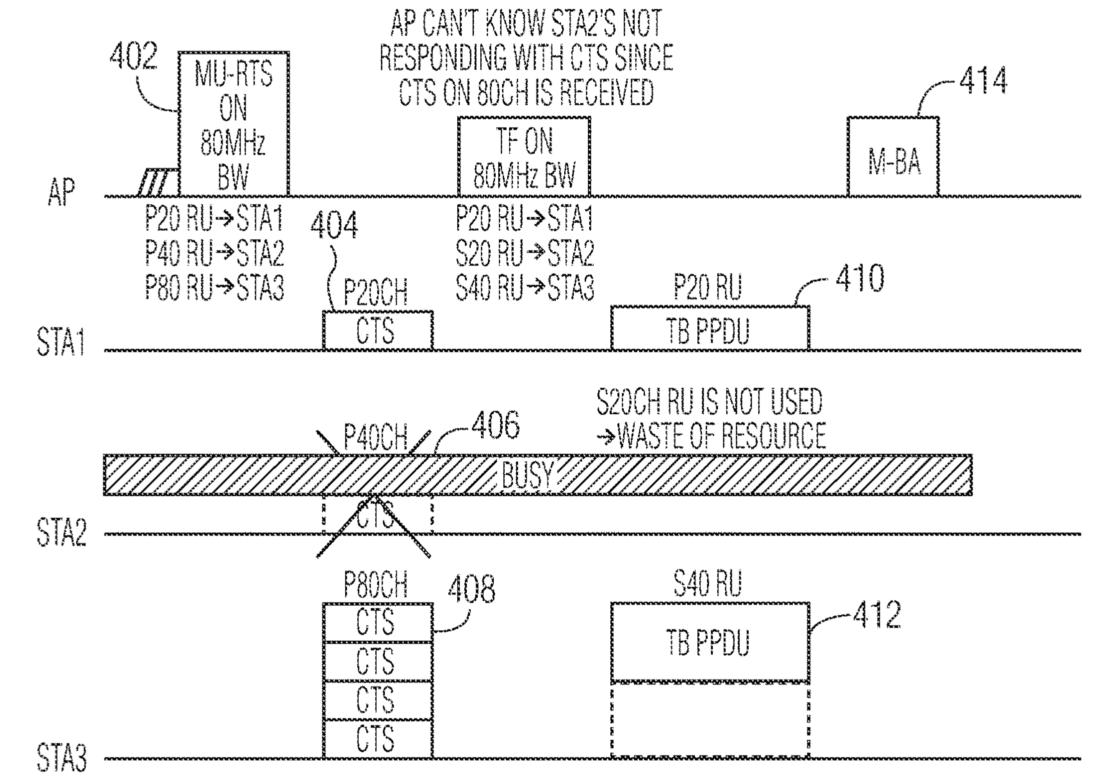
FIG. 4 illustrates CTS frames in response to an MU-RTS Trigger frame overlapping one or more 20 MHz subchannels according to an embodiment.

In some situations, more than one CTS frames in response to an MU-RTS Trigger frame may overlap one or more 20 MHz subchannels. FIG. 4 illustrates CTS frames in response to an MU-RTS Trigger frame overlapping one or more 20 MHz subchannels according to an embodiment. For example, an MU-RTS Trigger frame 402 indicates RU allocations of primary 20 MHz channel to STA1, primary 40 MHz channel to STA2, primary 80 MHz channel to STA3. STA1 and STA3 respond with CTS frames 404 and 408. When STA2 does not respond with the CTS frame due to secondary 20 MHz channel being busy 406, the AP may receive a CTS frame 408 on the primary 80 MHz from STA3. In this case, the AP may not know whether or not STA2 transmits a CTS frame. The AP may allocate the RU on the secondary 20 MHZ channel to STA2, and it may incur resource waste since the STA2 does not transmit a TB PPDU due to busy channel. STA1 and STA2 transmit TB PPDUs 410 and 412 to the AP. The AP responds with a M-BA 414.

Figure 5:
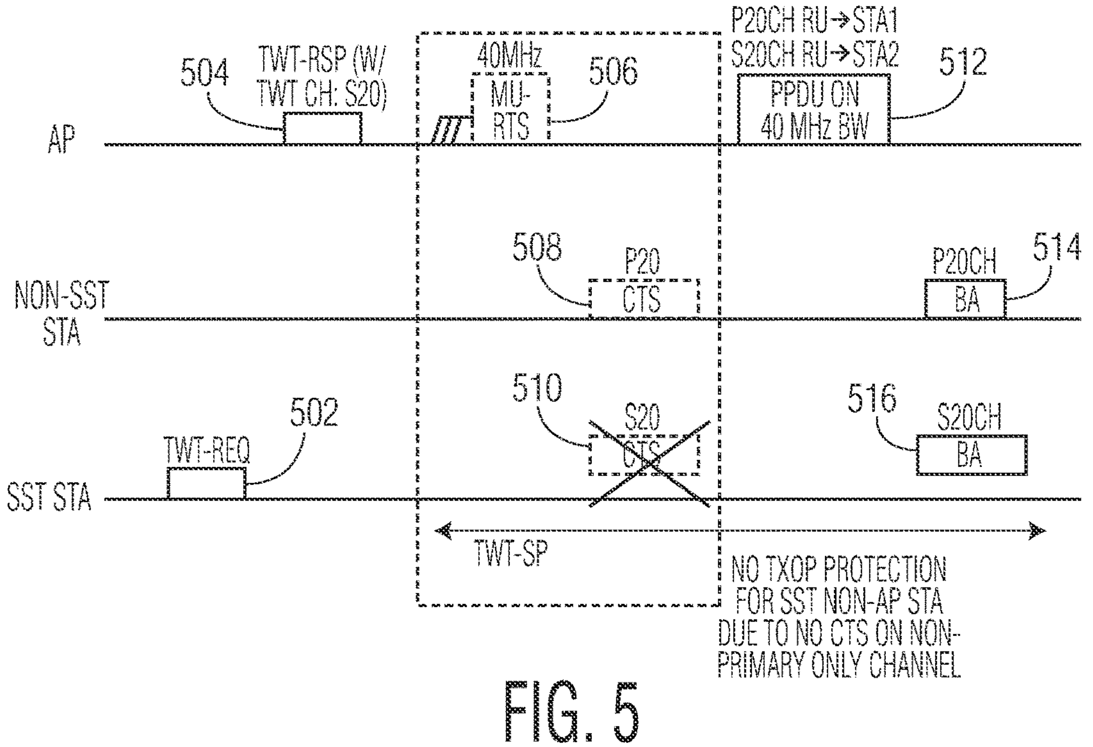
FIG. 5 illustrates subchannel selective transmission operation after individual TWT negotiation according to an embodiment.

In some situations, an SST non-AP STA may do the subchannel selective transmission operation after individual TWT negotiation. FIG. 5 illustrates subchannel selective transmission operation after individual TWT negotiation according to an embodiment. For example, an SST non-AP STA negotiates individual TWT with an AP and establishes the TWT channel with the secondary 20 MHz channel via an exchange of a TWT-req 502 and a TWT-Rsp 504. The SST non-AP STA can switch to the secondary 20 MHz channel when the TWT SP starts. If the AP obtains a TXOP within the TWT service period (SP) and intends to protect the TXOP before scheduling of a non-SST STA and the SST STA, the AP may transmit MU-RTS Trigger frame 506. The non-SST STA responds with a CTS 508. However, the SST STA is not able to respond with a CTS frame on the primary 20 MHz or primary 40 MHz channel since it operates on the secondary 20 MHz channel 510. Therefore, the existing TXOP protection mechanism using an RTS or an MU-RTS Trigger frame does not provide TXOP protection to an SST non-AP STA. The AP may then send a PPDU 512 and the non-SST STA and the SST STA respond with BA frames 514 and 516.

Figure 6:
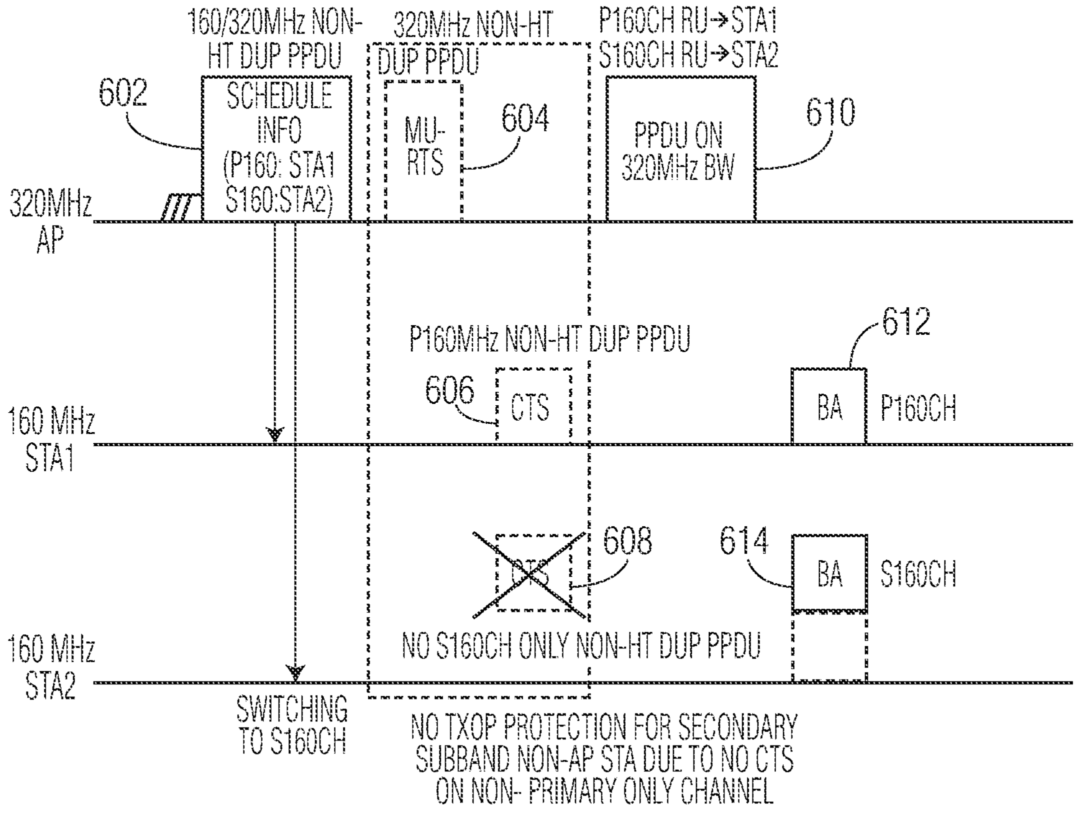
FIG. 6 illustrates a sub-band scheduling operation through non-AP STA's switching to a non-primary sub-band according to an embodiment.

In another situation, similar to SST operation, if a mechanism is defined for sub-band scheduling operation through non-AP STA's switching to a non-primary sub-band (e.g., secondary 160 MHz sub-band), a non-AP STA may switch to the non-primary sub-band after receiving a sub-band scheduling information from an AP. FIG. 6 illustrates a sub-band scheduling operation through non-AP STA's switching to a non-primary sub-band according to an embodiment. For example, according to the existing rule of (MU-)RTS/CTS, the non-AP STA switching to the non-primary sub-band is not able to respond with a CTS frame only on the non-primary sub-band.

Therefore, the existing TXOP protection mechanism using an RTS or an MU-RTS Trigger frame does not provide TXOP protection to a non-primary sub-band scheduled non-AP STA. The AP sends a non-HT Dup PPDU 602 with scheduling information. The AP then sends an MU-RTS 604 and STA1 responds with CTS 606, but STA2 cannot respond 608. The AP then sends a PPDU 610 and STA1 and STA2 respond with BAs 612 and 614.

Various embodiments of CTS transmission using a secondary channel will be described.

Figure 7:
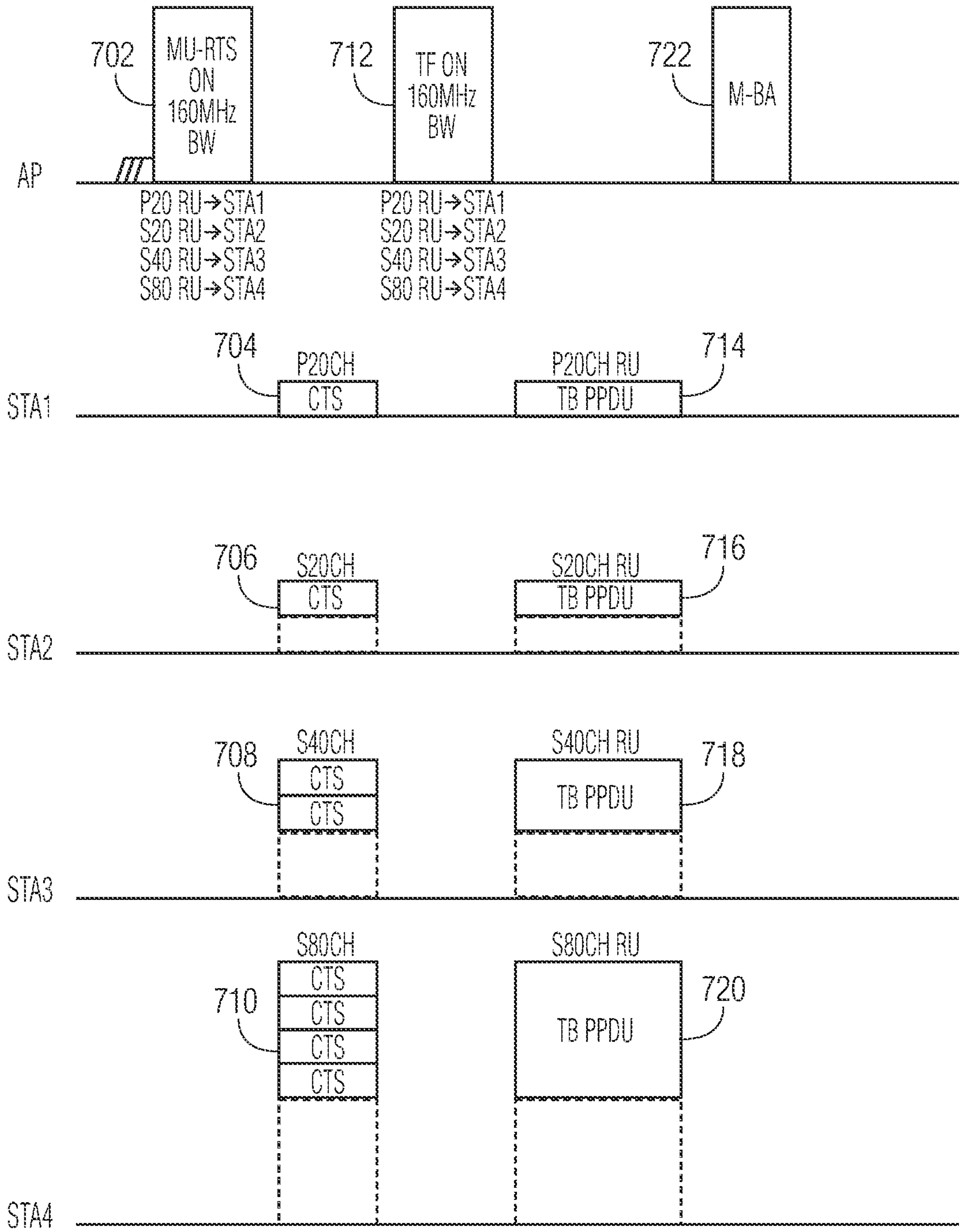
FIG. 7 illustrates a CTS transmission on only the secondary channel according to an embodiment.

A CTS transmission may only be done only on the secondary channel. FIG. 7 illustrates a CTS transmission on only the secondary channel according to an embodiment. An AP may allocate RU(s) to one or more non-AP STAs not occupying the primary 20 MHz channel in an MU-RTS Trigger frame 702. The MU-RTS Trigger 702 frame can be transmitted in a non-HT (duplicate) PPDU. A non-AP STA that is allocated an RU not occupying the primary 20 MHZ channel may respond with a CTS frame in a non-HT (duplicate) PPDU on the 20 MHZ subchannel(s) where the RU is allocated.

For example, an MU-RTS 702 indicates RU allocations of primary 20 MHz channel to STA1, secondary 20 MHz channel to STA2, secondary 40 MHz channel to STA3, and secondary 80 MHz channel to STA4. If a STA senses the allocated channel being idle, STA1, STA2, STA3, and STA4 may respond with a CTS frame 704, 706, 708, and 710 on the allocated 20 MHZ subchannel(s) in a non-HT (duplicate) PPDU. Based on the channel bandwidth of the received CTS frame(s) 704, 706, 708, and 710 (e.g., one or more 20 MHz subchannel(s) where the CTS frame(s) is received), the AP may schedule uplink and/or downlink transmission for non-AP STA(s) during the TXOP. Accordingly, STA1, STA2, STA3, and STA4 may transmit TB PPDUs 714, 716, 718, and 720 respectively. Then the AP responds with a M-BA 722.

Figure 8:
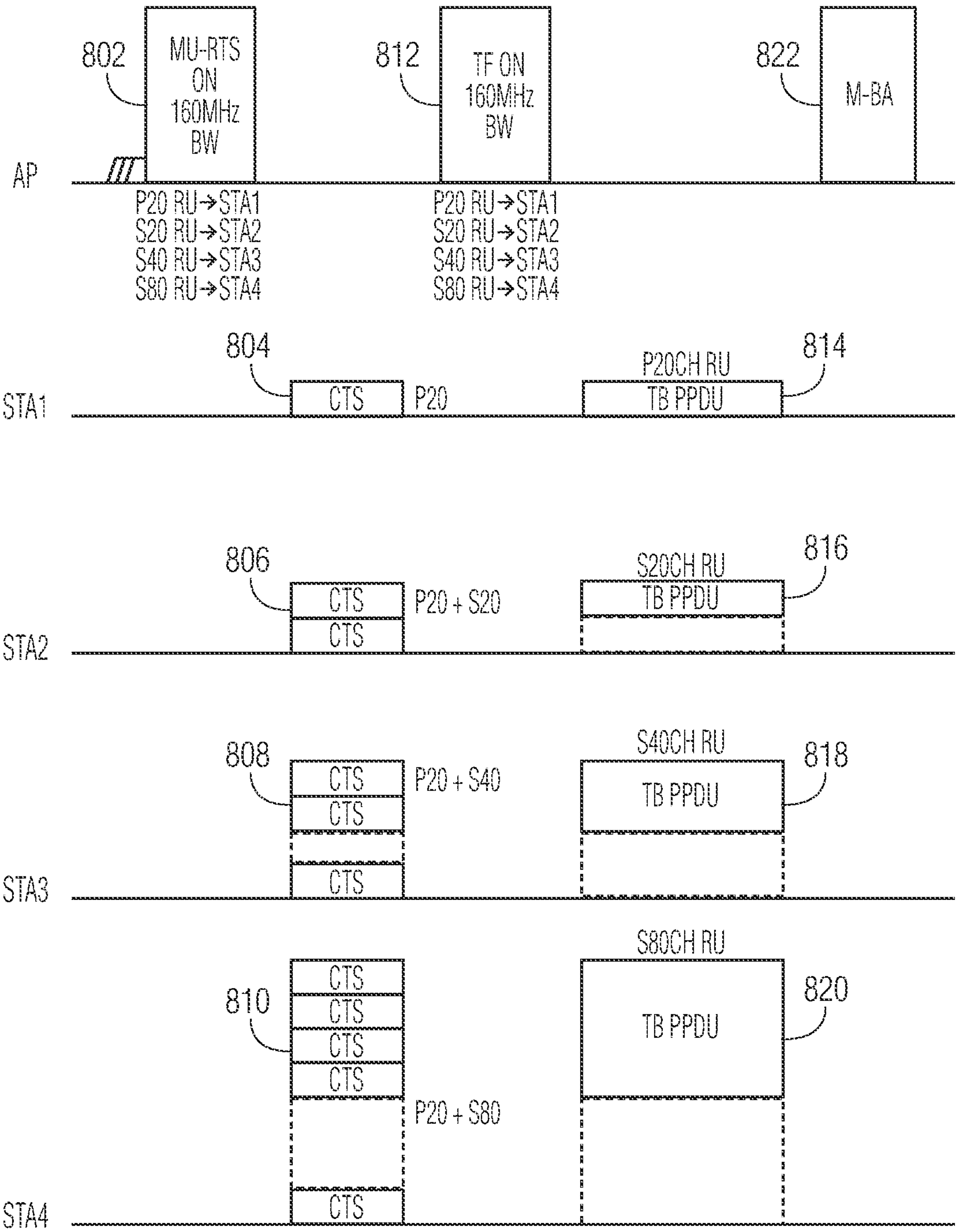
FIG. 8 illustrates a CTS transmission on a primary 20 MHz channel and the secondary channel(s) according to an embodiment.

A CTS transmission may only be done only on the secondary channel. FIG. 8 illustrates a CTS transmission on a primary 20 MHz channel and the secondary channel(s) according to an embodiment. In the embodiment of FIG. 7, if STA1 senses the primary 20 MHz channel being busy and does not respond with the CTS frame on the primary 20 MHz channel, the TXOP obtained by the AP may be cancelled because no CTS frame is received on the primary 20 MHZ channel in response to the MU-RTS Trigger frame. To avoid no CTS response on the primary 20 MHz channel, an AP may indicate that one or more non-AP STAs respond with a CTS frame on the primary 20 MHz channel and/or non-primary 20 MHz subchannel(s). For example, an MU-RTS Trigger frame 802 indicates RU allocations of: primary 20 MHz channel to STA1, primary secondary 20 MHz channel to STA2, secondary 40 MHz channel to STA3, and secondary 80 MHz channel to STA4. CTS transmission on the primary 20 MHz channel is preconfigured or predefined; RU allocations of primary 20 MHz channel to STA1, primary 20 MHz channel+secondary 20 MHz channel to STA2, primary 20 MHz channel+secondary 40 MHz channel to STA3, and primary 20 MHz channel+secondary 80 MHz channel to STA4; or indication of mandatory transmission of primary 20 MHz channel and respective secondary 20 MHZ subchannel(s) allocation in the User Info field. If a STA senses the allocated channel being idle, STA1, STA2, STA3, and STA4 may respond with a CTS frame 804, 806, 808, and 810 on the allocated 20 MHz subchannel(s) and the primary 20 MHz channel in a non-HT (Duplicate) PPDU. Based on the channel bandwidth of the received CTS frame(s) (e.g., one or more 20 MHZ subchannel(s) where the CTS frame(s) is received), the AP may schedule uplink and/or downlink transmission for non-AP STA(s) during the TXOP. This may be done by sending a Trigger frame (TF) 812. Then STA1, STA2, STA3, and STA4 send TB PPDUs 814, 816, 818, and 820 to the AP, and the AP responds with a M-BA 822.

Figure 9:
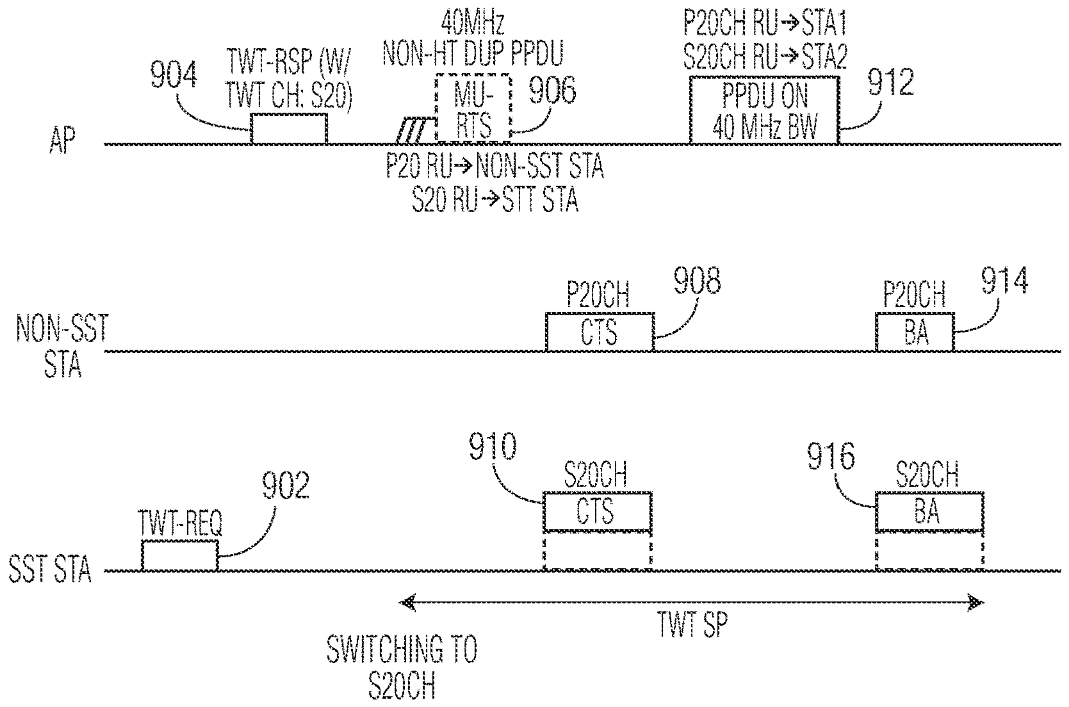
FIG. 9 illustrates a CTS transmission by an SST non-AP STA according to an embodiment.

A CTS transmission by an SST non-AP STA will now be described. FIG. 9 illustrates a CTS transmission by an SST non-AP STA according to an embodiment. An SST non-AP STA may respond with a CTS frame 910 on a non-primary 20 MHz channel that is operating. The SST may transmit a TWT-Req frame 902, and the AP responds with a TWT-Rsp frame 904. For example, if an SST non-AP STA operates on the secondary 20 MHz channel during individual TWT SPs, an AP may transmit an MU-RTS Trigger frame 906 indicating RU allocation of the SST non-AP STA to the secondary 20 MHz channel, or the primary 40 MHz channel (including the secondary 20 MHz channel). The SST non-AP STA operating on the secondary 20 MHZ channel may respond with a CTS frame 910 on the secondary 20 MHz channel in response to the MU-RTS frame 906 if it senses the secondary 20 MHz channel being idle. In addition, if an SST non-AP STA operates on one of 20 MHz subchannels of secondary 80 MHz or secondary 160 MHz, the RU allocation of the SST non-AP STA in an MU-RTS Trigger frame 906 can be indicated as one of 20 MHz subchannels of secondary 80 MHz or secondary 160 MHZ (e.g., using 20 MHz subchannel bitmap, or subchannel index), or the primary 160 MHz channel or 320 MHz channel (including the 20 MHz operating subchannel). The non-SST STA also sends a CTS 908. The AP then sends a PPDU 912 and the non-SST STA and the SST STA respond with BAs 914 and 916.

Figure 10:
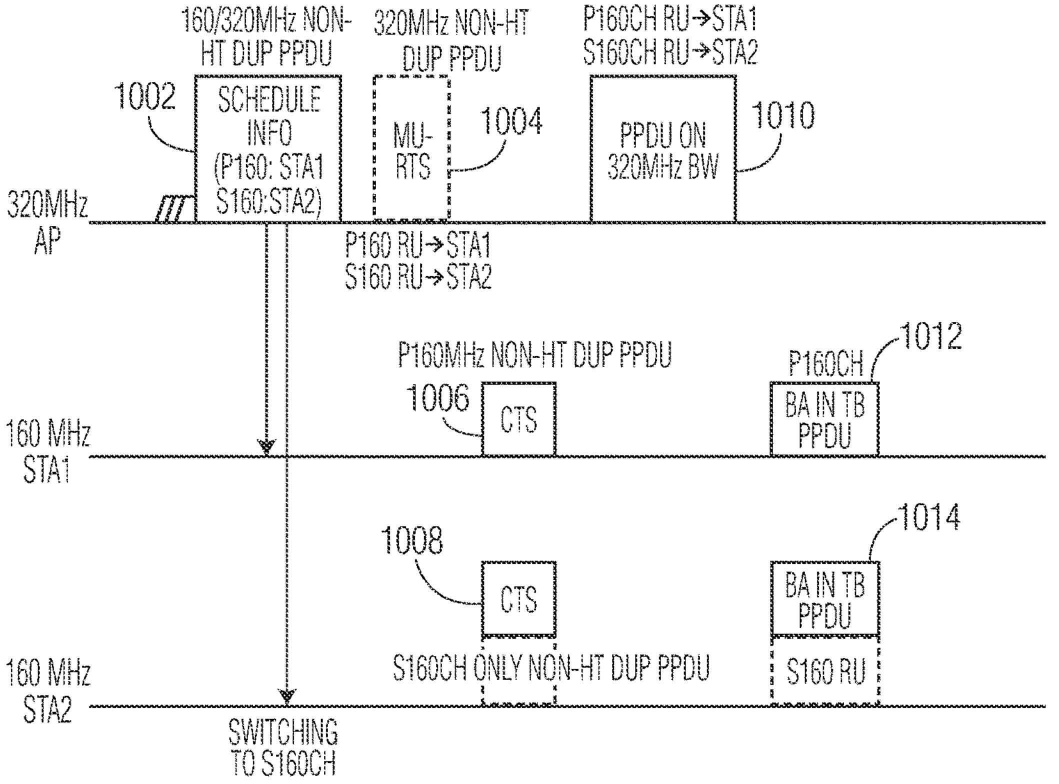
FIG. 10 illustrates a CTS transmission on a sub-band scheduled non-AP STA according to an embodiment.

A CTS transmission may be carried by a sub-band scheduled non-AP STA. FIG. 10 illustrates a CTS transmission by a sub-band scheduled non-AP STA according to an embodiment. Similar to the SST operation, if a mechanism is designed for sub-band scheduling operation through non-AP STA's switching to a non-primary sub-band (e.g., secondary 160 MHz sub-band), a non-AP STA may switch to the non-primary sub-band after receiving a sub-band scheduling information from an AP. The AP may send a non-HT Dup PPDU 1002 with schedule information. Then the AP may send a MU-RTS 1004. In this case, a sub-band scheduled non-AP STA may respond with a CTS frame 1006 or 1008 in response to an MU-RTS Trigger frame 1004 on a non-primary channel that is operating (e.g., secondary 160 MHz sub-band). For example, if a 160 MHz non-AP STA receives a frame indicating sub-band schedule information (e.g., schedule on secondary 160 MHz sub-band), an AP may transmit an MU-RTS Trigger frame 1004 indicating RU allocation of the 160 MHz non-AP STA to the secondary 160 MHz channel, or 320 MHz channel (including the secondary 160 MHz channel). The 160 MHZ non-AP STA switching to the secondary 160 MHz channel may respond with a CTS frame on the secondary 160 MHz channel in response to the MU-RTS frame if it senses the secondary 160 MHz channel being idle. The AP may then send PPDU 1010, and STA1 and STA2 may respond with BAs 1012 and 1014. In another example, transmission of the frame indicating the sub-band schedule information 1002 can be omitted and the MU-RTS Trigger frame 1004 can indicate sub-band schedule information. An AP may transmit an MU-RTS Trigger frame 1004 indicating RU allocation of the sub-band scheduled non-AP STA to the secondary 160 MHz channel without sending a separate frame indicating the sub-band schedule information 1002. The sub-band scheduled non-AP STA receiving the MU-RTS Trigger frame indicating the secondary 160 MHz channel allocation 1004 switches to the secondary 160 MHz channel and it may respond with a CTS frame on the secondary 160 MHz channel in response to the MU-RTS frame if it senses the secondary 160 MHz channel being idle. The AP receiving the CTS frame on the secondary 160 MHz channel from the sub-band scheduled non-AP STA may then send a PPDU to the sub-band scheduled non-AP STA using the RU of the secondary 160 MHz channel and the sub-band scheduled non-AP STA may respond with a BA frame in a TB PPDU on the RU of the secondary 160 MHz channel.

Figure 11:
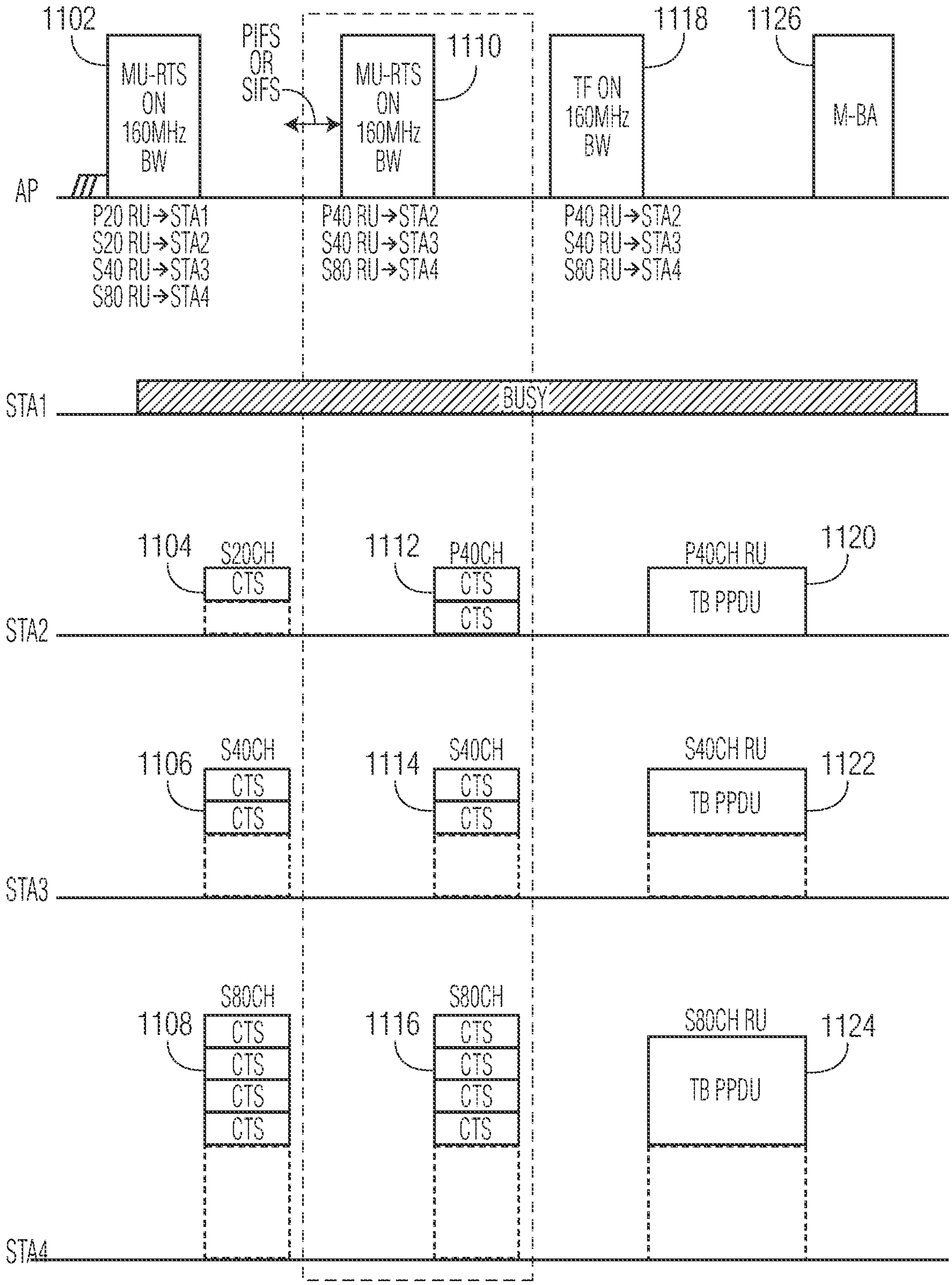
FIG. 11 illustrates an error recovery procedure for the embodiment of FIG. 6 according to an embodiment.

FIG. 11 illustrates an error recovery procedure for the embodiment of FIG. 6 according to an embodiment. In the embodiment of FIG. 6, if STA1 senses the primary 20 MHz channel as being busy and does not respond with the CTS frame on the primary 20 MHz channel, the TXOP obtained by the AP may be cancelled since no CTS frame is received on the primary 20 MHZ channel in response to the MU-RTS Trigger frame 1102. The other STAs send CTS frames 1104, 1106, and 1108. If an AP does not receive a CTS frame on the primary 20 MHz channel after transmitting an MU-RTS Trigger frame 1102, the AP may transmit another MU-RTS Trigger frame 1110 or other PPDU after SIFS (or PIFS) from the CTS transmission time (or CTS reception on non-primary 20 MHz subchannels). For example, an MU-RTS indicates RU allocations of primary 20 MHz channel to STA1, secondary 20 MHz channel to STA2, secondary 40 MHz channel to STA3, and secondary 80 MHz channel to STA4. If STA1 senses the allocated channel (e.g., primary 20 MHz channel) being busy, the STA1 does not respond with a CTS frame. If STA2, STA3 and STA4 sense the allocated channel being idle, STA2, STA3 and STA4 may respond with a CTS frame 1112, 1114, and 1116 on the allocated 20 MHZ subchannel(s) in a non-HT (Duplicate) PPDU. When the AP does not receive a CTS frame on the primary 20 MHz channel in response to the MU-RTS Trigger frame 1110, the AP may: transmit another MU-RTS Trigger frame (e.g., primary 40 MHz allocation to STA2, etc.); transmit other PPDU on the channel BW depending on the BW of the received CTS frame (e.g., 160 MHz PPDU with RU allocation of the primary 20 MHz channel to STA that is not STA1); or transmit a CF-End frame. When the AP receives CTS frame(s) 1112, 1114, or 1116 (on the primary 20 MHz channel) in response to the MU-RTS Trigger frame 1110, the AP may transmit other PPDU on the channel BW depending on the BW of the received CTS frame. For example, the AP may transmit a Trigger frame 1118, and STA2, STA3, and STA4 respond with TB PPDU frames 1120, 1122, and 1124. The AP then transmits a M-BA 1126. In this case, the AP may or may not allocate the RU occupying the primary 20 MHz channel to any STA in the Trigger frame 1118.

Figure 12:
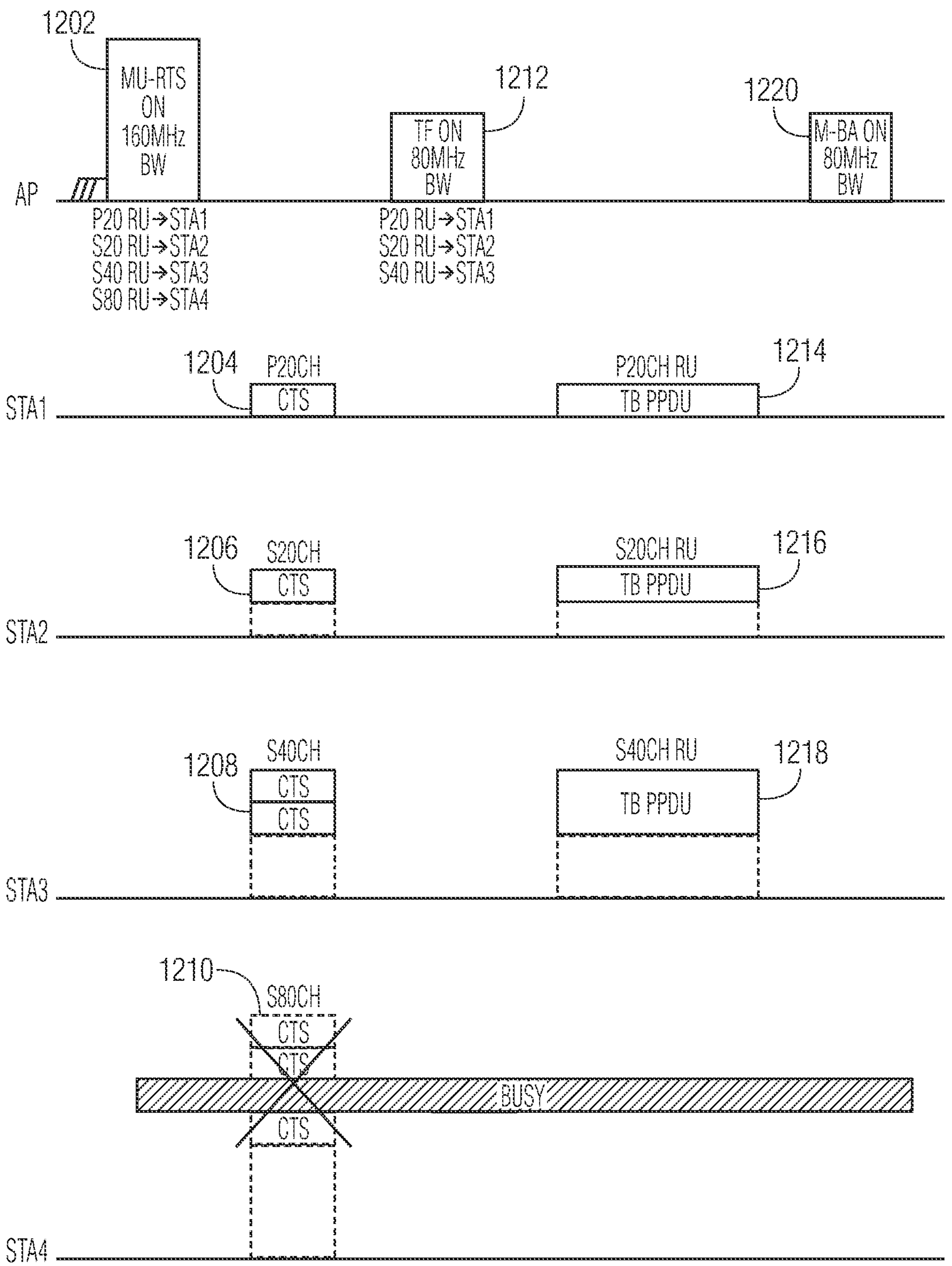
FIG. 12 illustrates a CTS transmission when the allocated subchannel is busy according to an embodiment.

FIG. 12 illustrates a CTS transmission when the allocated subchannel is busy according to an embodiment. The AP transmits a MU-RTS 1202. A non-AP STA, e.g., STA4, that senses one of the allocated non-primary 20 MHz subchannels being busy may not transmit a CTS frame 1210 on the entire allocated non-primary 20 MHz subchannels. It is consistent with the existing rule for CTS frame transmission on the channel including the primary 20 MHz channel. The other STAs transmit CTS frames 1204, 1206, and 1208. If an AP does not receive a CTS frame from a non-AP STA (e.g., STA4) 1210, the AP can figure out which non-AP STA does not respond with the CTS frame 1210, and it can schedule a resource to other non-AP STA (e.g., STA1, STA2 and STA3, etc.) using trigger frame 1212 appropriately since the RU allocation in the MU-RTS Trigger frame for CTS frame transmission is not overlapped among non-AP STAs. Then STA1, STA2, and STA3 responds with TB PPDU frames 1214, 1216, and 1218. The AP responds with a M-BA 1220.

Figure 13:
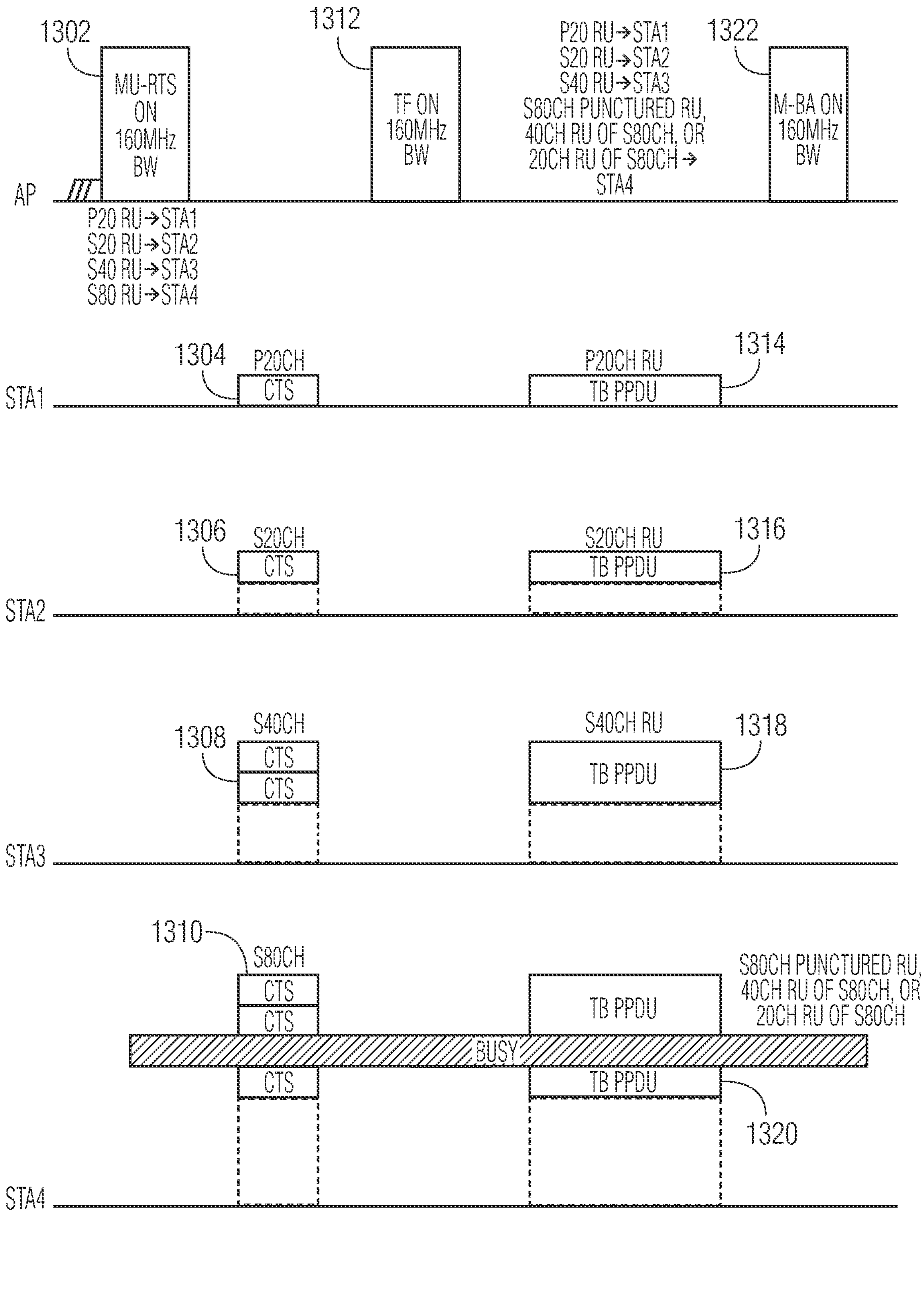
FIG. 13 illustrates a CTS transmission when the allocated subchannel is busy according to an embodiment.

FIG. 13 illustrates a CTS transmission when the allocated subchannel is busy according to an embodiment. The AP sends MU-RTS 1302 on a 160 MHz bandwidth. A non-AP STA (e.g., STA4) that senses one of the allocated non-primary 20 MHz subchannels being busy may transmit a CTS frame on the idle non-primary 20 MHz subchannels. For example, the MU-RTS 1302 indicates RU allocations of primary 20 MHz channel to STA1, secondary 20 MHz channel to STA2, secondary 40 MHz channel to STA3, and secondary 80 MHz channel to STA4. If STA 1, STA2 and STA3 sense the allocated channel being idle, STA1, STA2 and STA3 may respond with a CTS frames 1304, 1306, and 1308 on the allocated 20 MHz subchannel(s) in a non-HT (Duplicate) PPDU. If STA4 senses the allocated one of subchannel (e.g., the second lowest 20 MHz subchannel) being busy, the STA4 may respond with a CTS frame in a non-HT (duplicate) PPDU 1310 on the secondary 80 MHz channel with the second lowest 20 MHz subchannel punctured, the highest 40 MHz CH of the secondary 80 MHz channel, or the lowest 20 MHz CH of the secondary 80 MHz channel. When the AP receives a CTS frame 1304, 1306, 1308, and 1310 from STA1, STA2, STA3 and STA4 on one of the channel above in response to the MU-RTS Trigger frame, the AP may transmit a PPDU 1312 (e.g., a target frame) for scheduling the non-AP STAs on the channel BW depending on the BW of the received CTS frame. STA1, STA2, STA3, and STA4 then responds with TB PPDU frames 1314, 1316, 1318, and 1320. The AP responds with M-BA 1322.

Figure 14:
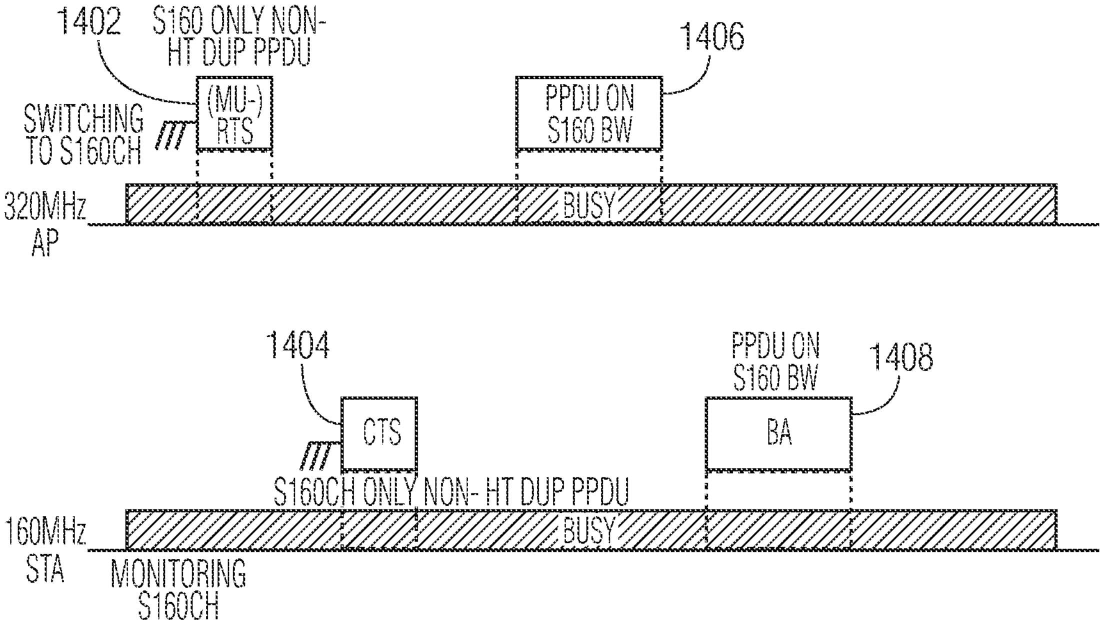
FIG. 14 illustrates TXOP protection for secondary channel access according to an embodiment.

FIG. 14 illustrates TXOP protection for secondary channel access according to an embodiment. When an AP or a non-AP STA senses the primary channel being busy (e.g., due to non-zero basic NAV), the AP or the non-AP STA may access the non-primary channel during the time of the primary channel being busy. In this case, the TXOP obtained on the non-primary channel can be protected by (MU)RTS 1402 and CTS frame 1404 transmitted on the non-primary channel. For example, an AP that senses the primary channel being busy may obtain a TXOP on the secondary 160 MHz channel and transmit an (MU-)RTS frame 1402 to a non-AP STA. The non-AP STA that senses the primary channel being busy switches to the non-primary 160 MHz channel and it receives the (MU-)RTS frame 1402 on the non-primary 160 MHZ channel from the AP. The non-AP STA may respond with a CTS frame 1404 in a non-HT duplicate PPDU only on the secondary 160 MHz channel if the secondary 160 MHz channel is idle. During the time of the primary channel being busy, the AP and the non-AP STA may exchange frames on the secondary 160 MHz channel, for example, PPDU 1406 and BA 1408.

Figure 15:
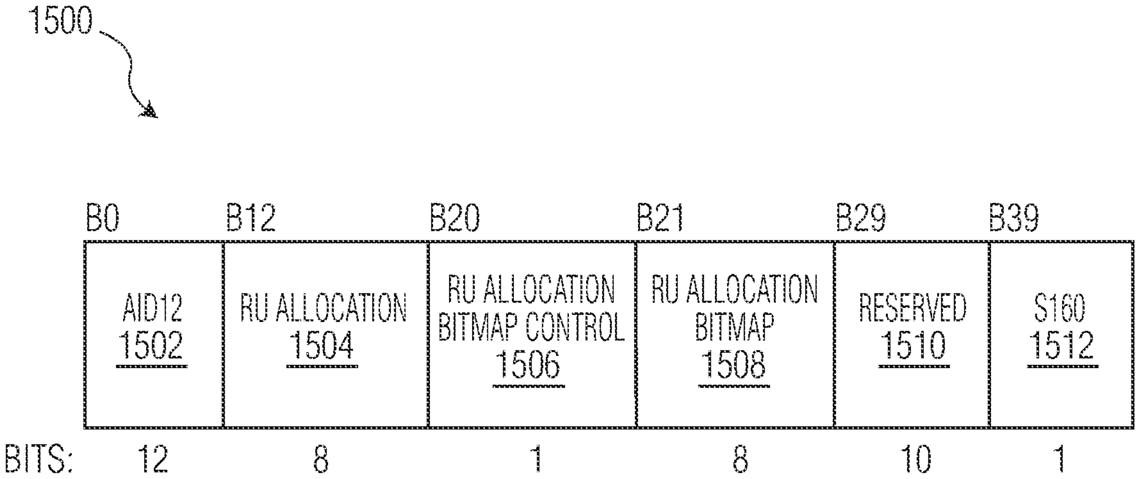
FIG. 15 illustrates a proposed MU-RTS Trigger frame format to accommodate using secondary channels according to an embodiment.

FIG. 15 illustrates a proposed MU-RTS Trigger frame format to accommodate using secondary channels according to an embodiment. MU-RTS Trigger 1500 frame includes the RU allocation information where a non-AP STA transmits a CTS frame on a non-primary channel. The AID12 subfield 1502 and the RU Allocation subfield 1504 are the same as in the existing standard. The RU Allocation Bitmap Control subfield 1506 indicates whether the RU Allocation subfield or the RU Allocation Bitmap is used. If the RU Allocation Bitmap Control subfield 1506 is set to 0 to indicate the RU Allocation subfield 1504 is being used (as in the existing standard) and is set to 1 to indicate a RU Allocation Bitmap subfield 1508 is being used (as in the proposal). The RU Allocation Bitmap subfield 1508 indicates one or more 20 MHZ subchannel(s) where a CTS frame is transmitted when the corresponding 20 MHz subchannel(s) is idle. Each bit indicates whether or not the corresponding 20 MHz subchannel is allocated. The bits are set to 1 if the corresponding 20 MHz channel is allocated, but otherwise is set to 0. In this example, B21 indicates the lowest 20 MHz subchannel and B28 indicates the highest 20 MHz subchannel of the 160 MHz channel, but the opposite could be true as well. If the BW carrying a PPDU of the MU-RTS Trigger frame is less than 160 MHz BW, the upper bits of the RU Allocation Bitmap might be reserved (e.g., B25 to B28 of the RU Allocation Bitmap subfield are reserved in the MU-RTS with 80 MHz BW). The S160 subfield 1512 indicates whether the RU Allocation Bitmap subfield indicates the secondary 160 MHz channel. The S160 subfield 1512 is set to 0 to indicate the primary 160 MHz channel and set to 1 to indicate the secondary 160 MHz channel. When the RU Allocation Bitmap Control subfield 1506 is set to 0, the RU Allocation Bitmap subfield 1508 and the S160 subfield 1512 are reserved. In another example, the S160 subfield 1512 can be replaced with a 1 bit indication (e.g., SCH Ind) to indicate the secondary channel being allocated. For example, if the RU Allocation subfield or the RU Allocation Bitmap subfield indicates 40 MHz channel and if the 1 bit indication (e.g., SCH Ind) subfield indicates the secondary channel being allocated (e.g., the bit set to 1), a secondary 40 MHz channel is allocated to a non-AP STA and the non-AP STA responds with a CTS frame in a non-HT duplicate PPDU on the secondary 40 MHz channel when the secondary 40 MHz channel is idle.

CTS frame detection at an AP will now be discussed. To reduce the complexity for parallel processing of the CTS frame received on 20 MHz subchannels, an AP can do at least one of the following. The AP may detect a CTS frame on a specific 20 MHz subchannel (e.g., virtual control channel for CTS frame reception) per 40 MHz CH or per 80 MHz CH to determine the TXOP BW. For example, if a virtual control channel is assigned per 40 MHz, an AP can detect a CTS frame per 40 MHz channel within the BW (e.g., P40CH and S40CH of P80CH, and 1st 40CH and 2nd 40CH of S80CH in 160 MHz BW, etc.).

The AP may limit the number of allocated RU in an MU-RTS Trigger frame. For example, in the embodiment of FIG. 7, the number of allocated RUs is limited to 4 (e.g., P20, S20, S40, S80). Then, an AP can detect a CTS frame on each allocated RU (so, the AP just needs to be able to detect up to 4 CTS frames in total). In the embodiments in FIGS. 9 and 10, the number of allocated RUs is limited to 2 (e.g., P20/S20, P160/S160). Then, an AP can detect a CTS frame on each allocated RU (so, the AP just need to be able to detect up to 2 CTS frames in total).

The AP may detect a CTS frame on the primary channel and determine the CTS frame reception based on the energy detection or the preamble detection (e.g., L-STF, L-LTF, etc.) on each 20 MHz subchannel of the secondary channel where the RU is allocated, or, e.g., the clear channel assessment (CCA) result of each 20 MHz subchannel can be used to determine whether a CTS frame is received on the 20 MHz subchannel of the secondary channel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

We claim:

1. A method comprising:

transmitting, by an access point (AP), a multi-user request to send (MU-RTS) frame requesting a non-AP station (non-AP STA) to respond with a clear to send (CTS) frame on one or more 20 MHz non-primary subchannels identified by a resource unit (RU) allocation bitmap field in the MU-RTS frame indicating 20 MHz non-primary subchannels available to the non-AP STA for a CTS frame transmission; and receiving, by the AP, a CTS frame from the non-AP STA on only the one or more 20 MHz non-primary subchannels identified by the RU allocation bitmap field;

wherein the MU-RTS frame further comprises an RU allocation bitmap control subfield; wherein responsive to the RU allocation bitmap control subfield being set, the non-AP station determines the one or more 20 MHz non-primary subchannels for transmitting the CTS frame based on the RU allocation bitmap field instead of the RU allocation subfield; and the CTS frame is transmitted only on the one or more 20 MHz non-primary subchannels, each corresponding to bits set in the RU allocation bitmap field.

2. The method of claim 1, wherein the non-AP STA responds on at least one of a plurality of 20 MHz non-primary subchannels and wherein the received CTS frame is received on at least one of the plurality of 20 MHz non-primary channels.

3. The method of claim 2, wherein the non-AP STA responds on at least one of a plurality of 20 MHz non-primary subchannels when at least one of the plurality of 20 MHz non-primary channels is idle.

4. The method of claim 1, wherein the non-AP STA is a subchannel selective transmission (SST) non-AP STA.

5. The method of claim 1, further comprising sending, by the AP, sub-band scheduling information to the non-AP STA.

6. The method of claim 1, wherein each bit of the RU allocation bitmap field indicates whether not a corresponding 20 MHz subchannel of a 160 MHz channel is allocated to the CTS transmission.

7. A method comprising:

receiving, by a non-access point station (non-AP STA) from an access point (AP), an multi-user request to send (MU-RTS) indicating that the non-AP STA responds with a clear to send (CTS) frame on one or more 20 MHz non-primary subchannels identified by a resource unit (RU) allocation bitmap field in the MU-RTS frame indicating 20 MHz non-primary subchannels available to the non-AP STA for a CTS frame transmission;

performing, by the non-AP STA, a carrier sense operation on the one or more 20 MHz non-primary subchannels to determine whether the 20 MHz non-primary subchannel is idle; and transmitting, by the non-AP STA, a CTS frame on only the one or more 20 MHz non-primary subchannels identified by the RU allocation bitmap field when the corresponding 20 MHz non-primary subchannel is idle based on the carrier sense operation;

wherein the MU-RTS frame further comprises an RU allocation bitmap control subfield; wherein responsive to the RU allocation bitmap control subfield being set, the non-AP station determines the one or more 20 MHz non-primary subchannels for transmitting the CTS frame based on the RU allocation bitmap field instead of the RU allocation subfield; and the CTS frame is transmitted only on the one or more 20 MHz non-primary subchannels, each corresponding to bits set in the RU allocation bitmap field.

8. The method of claim 7, wherein the non-AP STA responds on at least one of a plurality of 20 MHz non-primary subchannels and wherein the CTS frame is transmitted on at least one of the plurality of 20 MHz non-primary channels.

9. The method of claim 8, wherein the non-AP STA transmits the CTS frame on at least one of a plurality of 20 MHz non-primary subchannels when at least one of the plurality of 20 MHz non-primary channels is idle.

10. The method of claim 7, wherein the non-AP STA is a subchannel selective transmission (SST) non-AP STA.

11. The method of claim 7, further comprising receiving, by the non-AP STA, from the AP sub-band scheduling information.

12. The method of claim 7, wherein each bit of the RU allocation bitmap field indicates whether not a corresponding 20 MHz subchannel of a 160 MHz channel is allocated to the CTS transmission.

13. An wireless system, comprising:

non-access point station (non-AP STA); and an access point (AP), comprising a processor configured to:

transmit a multi-user request to send (MU-RTS) frame requesting a non-AP station (non-AP STA) to respond with a clear to send (CTS) frame on one or more 20 MHz non-primary subchannels identified by a resource unit (RU) allocation bitmap field in the MU-RTS frame indicating 20 MHz non-primary subchannels available to the non-AP STA for a CTS frame transmission; and receive a CTS frame from the non-AP STA on only the one or more 20 MHz non-primary subchannels identified by the RU allocation bitmap field;

wherein the MU-RTS frame further comprises an RU allocation bitmap control subfield; wherein responsive to the RU allocation bitmap control subfield being set, the non-AP station determines the one or more 20 MHz non-primary subchannels for transmitting the CTS frame based on the RU allocation bitmap field instead of the RU allocation subfield; and the CTS frame is transmitted only on the one or more 20 MHz non-primary subchannels, each corresponding to bits set in the RU allocation bitmap field.

14. The wireless system of claim 13, wherein the non-AP STA comprises a processor configured to:

receive an multi-user request to send (MU-RTS) indicating that the non-AP STA responds with a clear to send (CTS) frame on one or more 20 MHz non-primary subchannels;

perform a carrier sense operation on the one or more 20 MHz non-primary subchannels to determine whether the 20 MHz non-primary subchannel is idle; and transmit a CTS frame on the one or more 20 MHz non-primary subchannels when the corresponding 20 MHz non-primary subchannel is idle based on the carrier sense operation.

15. The wireless system of claim 13, wherein each bit of the RU allocation bitmap field indicates whether not a corresponding 20 MHz subchannel of a 160 MHz channel is allocated to the CTS transmission.

* * * * *